United States Patent
Yokota et al.

(10) Patent No.: US 7,239,960 B2
(45) Date of Patent: Jul. 3, 2007

(54) NAVIGATION METHOD AND SYSTEM FOR VISITING MULTIPLE DESTINATIONS BY MINIMUM NUMBER OF STOPS

(75) Inventors: Tatsuo Yokota, Torrance, CA (US); Joanna Sagami, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 698 days.

(21) Appl. No.: 10/782,600

(22) Filed: Feb. 19, 2004

(65) Prior Publication Data

US 2005/0187707 A1 Aug. 25, 2005

(51) Int. Cl.
*G01C 21/34* (2006.01)
(52) U.S. Cl. .............. 701/202; 701/209; 340/995.19; 340/995.23
(58) Field of Classification Search ............. 701/200, 701/202, 209–211; 340/995.1, 995.19, 995.21, 340/995.23
See application file for complete search history.

(56) References Cited

U.S. PATENT DOCUMENTS

| 6,763,299 B2 * | 7/2004 | Jones ..................... 701/201 |
| 2002/0183924 A1 | 12/2002 | Yokota |
| 2007/0005235 A1 * | 1/2007 | Suzuki et al. ............ 701/200 |
| 2007/0005242 A1 * | 1/2007 | Kato et al. .............. 701/211 |

\* cited by examiner

*Primary Examiner*—Gary Chin
(74) *Attorney, Agent, or Firm*—Muramatsu & Associates (57) ABSTRACT

A navigation method and apparatus finds a location and a route to a plurality of destinations with the minimum number of stops or the shortest overall distance. The navigation method includes the steps of: specifying a plurality of destinations in a navigation system; searching a one-stop location where two or more specified destinations exist or searching a location of each destination; displaying results of search for prompting a user to decide whether recommended locations of the destinations in the search result is acceptable; repeating the above steps of searching locations and displaying the search results until the user accepts recommended locations of the destinations; and guiding the user to the destinations accepted by the user.

20 Claims, 11 Drawing Sheets

| Dest | Find Destination by | |
|---|---|---|
| | Address | Previous Visits |
| | Intersection | Address Book |
| | Point of Interest | Favorite Chain |
| | Map Cursor | Today's Plan |

Fig. 6B

| Dest | Find Destination by | |
|---|---|---|
| | Address | Previous Visits |
| | Intersection | Address Book |
| | Point of Interest | Favorite Chain |
| | Map Cursor | Today's Plan |

Fig. 6C

| Select Search Method | |
|---|---|
| Place Name | Place Type |
| Search by Multi-Place Name | |
| Search by Milti-Place Type | |
| Recent Route to Multi-Place | |

Fig. 7A

| Select Search Method |
| --- |
| Place Name / Place Type |
| Search by Multi-Place Name |
| Search by Milti-Place Type |
| Recent Route to Multi-Place |

Fig. 7B

Select Place Type

| | |
| --- | --- |
| Automobile | Health |
| Community | Home / Garden |
| Entertainment | Recreation |
| Food / Dining | Travel |

Fig. 7C

Select Place Type

| | |
| --- | --- |
| Bakeries | Supermarkets |
| Beverages | Produce |
| Catering | Restaurants |
| Fast Food | Speciality Food |

| | Arrival Priority | | |
|---|---|---|---|
| Dest 1 | Supermarket | Last | —73 |
| Dest 2 | ATM | First | —73 |
| Dest 3 | Pizza | 2 | —73 |
| Dest 4 | Flower Shop | 3 | —73 |
| Search Range | 10 mi ▽ —75 | OK | —71 |

Fig. 11B

| | Arrival Priority | | |
|---|---|---|---|
| Dest 1 | Supermarket | 3 | —73 |
| Dest 2 | ATM | Random | —73 |
| Dest 3 | 2120 Main St, Irvine, CA | Last | —73 |
| Dest 4 | Post Office | Random | —73 |
| Search Range | 10 mi ▽ —75 | OK | —71 |

NAVIGATION METHOD AND SYSTEM FOR VISITING MULTIPLE DESTINATIONS BY MINIMUM NUMBER OF STOPS

FIELD OF THE INVENTION

This invention relates to a navigation method and system for guiding a user to a destination, and more particularly, to a navigation method and apparatus which is able to find locations and routes to destinations for efficiently visiting a plurality of destinations with the minimum number of stops or the shortest overall distance.

BACKGROUND OF THE INVENTION

A navigation system performs travel guidance for enabling a user to easily and quickly reach the selected destination. A typical example is a vehicle navigation system where a vehicle is equipped with a navigation function. Such a navigation system detects the position of the user or user's vehicle, and reads out map data pertaining to an area at the current vehicle position from a data storage medium, for example, a CD-ROM (compact disc read-only memory), a DVD (digital versatile disc), or a hard disc. Alternatively, such map data can be provided to the user from a remote navigation server through a communication network such as Internet.

When a destination is set, the navigation system starts a route guidance function for setting a guided route from the start point to the destination. During the route guidance, the navigation system reads the nodes data from the data storage medium such as DVD and successively stores the nodes data of road segments constituting the guided route in a map memory. In the actual traveling, the node series stored in the map memory is searched for a portion of the guided route to be displayed, and a portion of the guided route is highlighted to be clearly distinguished from other routes. When the vehicle is within a predetermined distance of an intersection it is approaching, an enlarged or highlighted intersection diagram with an arrow indicating the direction in which the vehicle is to turn at the intersection is displayed to inform the user of the street and direction to turn at the intersection. Typically, such route guidance is also given by voice instruction.

Figure 1A:
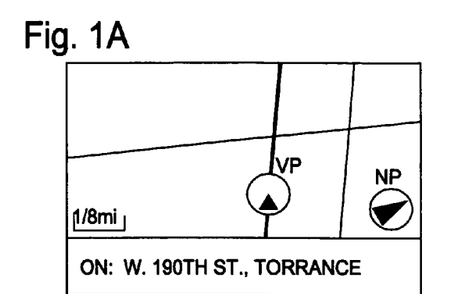
FIGS. 1A-1H are schematic diagrams showing an example of operational process and screen display involved in the navigation system for selecting a destination.

FIGS. 1A-1H show a typical example of overall procedure and screen display involved in the navigation system. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

Figure 1B:
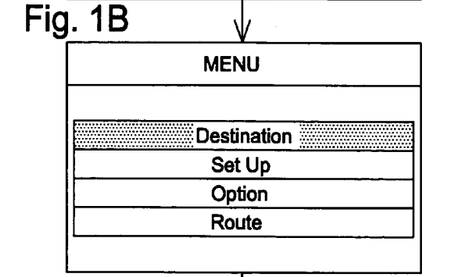
Figure 1C:
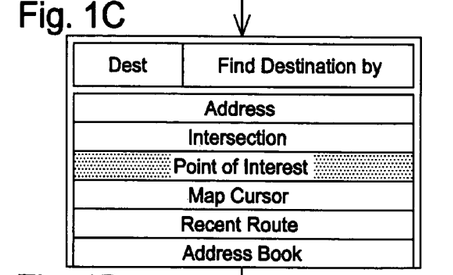

An example of process for specifying a destination in the navigation system through a Point of Interest (POI) search method is shown in FIG. 1B-1F. A main menu screen such as shown in FIG. 1B displays menu items including a "Destination" menu for entering the destination. When selecting "Destination", the navigation system displays a "Find Destination by" screen as shown in FIG. 1C for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

Figure 1D:
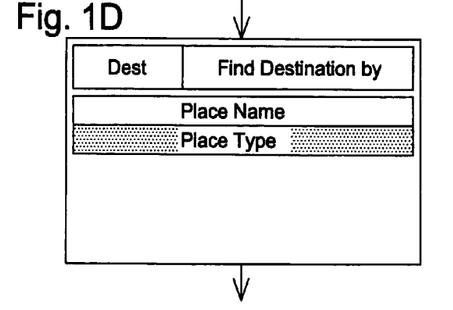
Figure 1E:
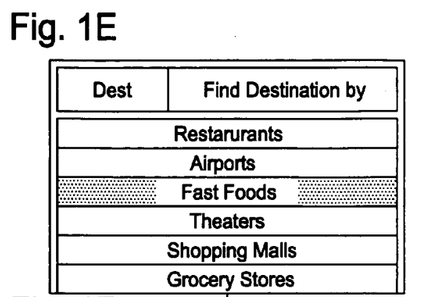

When selecting, the "Point of Interest" method in FIG. 1C, the navigation system displays selection methods of point of interest (POI) either by "Place Name" or "Place Type" in FIG. 1D. The "Place Name" is to specify a name of POI, and the "Place Type" is to specify a category of POI. If the "Place Type" is selected in FIG. 1D, the navigation system lists categories of POIs as shown in FIG. 1E. The user selects a desired category of POIs from the lists.

Figure 1F:
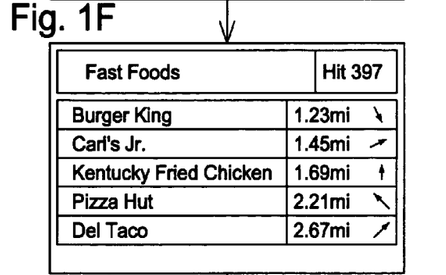
Figure 1G:
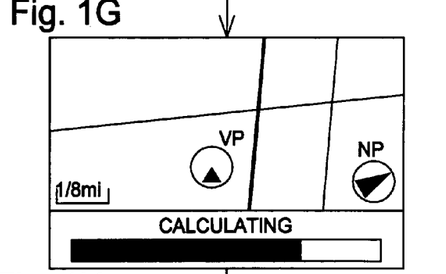
Figure 1H:
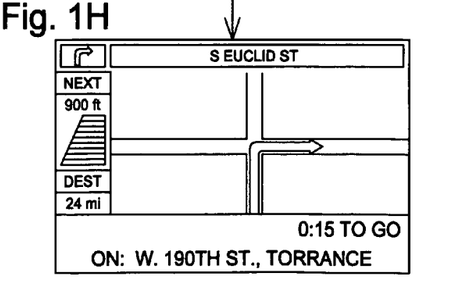

FIG. 1F shows a screen when the user has selected a "Fast Foods" category in the example of FIG. 1E. In this example, the screen includes a list of names of the fast food restaurants typically sorted by distance from the current position of the user. The user selects a particular fast food restaurant from the list. In FIG. 1G, the navigation system calculates a route to the destination. After determining the route, the navigation system starts the route guidance as shown in FIG. 1H. Typically, the navigation system shows the intersection that is highlighted to show the next turn and a direction of the turn.

The navigation system noted above, however, cannot successfully provide the need of a user who wants to visit two or more places, typically, POIs (points of interest), with one stop of a car or a least number of stops. Such a need arises when a user is handicapped, or is traveling with a handicapped person, a baby, or an elder person, etc. In other instance, a user may want to visit two or more POIs with a minimum length of travel, or a user may want to specify an order of arriving the destinations such as a last destination to visit.

Figure 2:
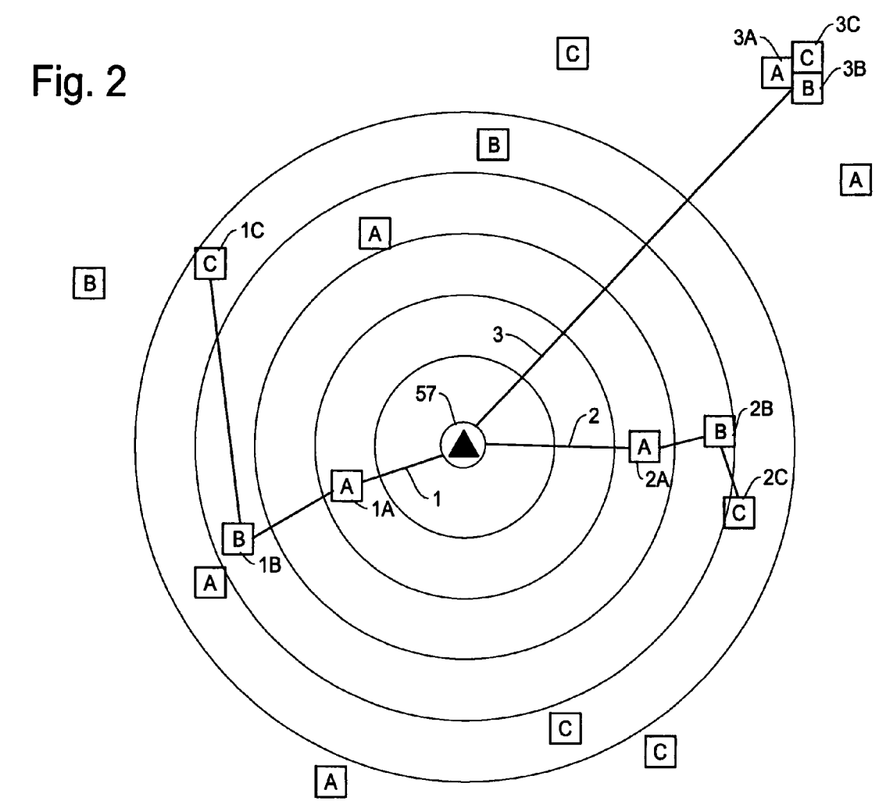
FIG. 2 is a schematic diagram showing a situation where the user wants to visit three different types of destinations and comparing different locations and routes to accomplish the objective.

FIG. 2 is a schematic diagram showing a map image for explaining a situation where the user wants to reach three destinations. For explanation purposes, it is assumed that a location mark "A" represents an ATM, a location mark "B" represents a pizza shop, and a location mark "C" represents a supermarket. A reference number 57 indicates a current vehicle (user) position and equidistance circles are illustrated on the map image around the current vehicle position 57.

The user wants to take out some cash, eat pizza for a lunch, and shop at a supermarket. The user does not care which ATM, pizza shop, or supermarket to visit as long as the user can accomplish the purposes by making the trip. Thus, there are many candidate locations for each category of places. If the user wants to visit an ATM, pizza eatery, and supermarket in that order, there are several choices. In a conventional navigation system, the first destination that is nearest to the present location is normally selected first, then the second destination that is nearest to the first destination, and then to third destination that is nearest to the second destination.

In FIG. 2, if the navigation system is to use the conventional multiple POI search method, a guided route 1 will first direct the user to a location 1A (ATM), then to a location 1B (pizza), and finally to a location 1C (supermarket). However, although the location 1A is nearest to the present user position and the location 1B is relatively close to the location 1A, the location 1C is far away from the location 1B. As a result, the overall distance for the trip can be long.

In many cases, it is desirable to produce a guided route 2 that first directs the user to a location 2A, then to a location 2B, and finally to a location 2C even if the first destination 2A is located farther from the current position 57 than the location 1A. This is because the overall travel distance to reach all the destinations is shorter in the route 2 than the first route 1.

Even if the travel distance is the same or even longer, in many cases, the user prefers to stop the car as less as possible. That is, it is desirable that the user can accomplish the objectives of the trip at one location by one stop of the vehicle. In FIG. 2, POI locations 3A, 3B and 3C exist within a small area so that the user can visit all of them by one stop of a car. Although an overall travel distance of a route 3 is longer than that of the route 2, the user often prefers the route 3 because it relieves burdens of repeatedly riding and moving the vehicle.

For example, the user is relieved from the stress of finding a parking spot at each destination. Further, if a user is handicapped, or is traveling with a handicapped person using a wheelchair, the route 3 can minimize the trouble of getting on and off the vehicle. Moreover, the one-stop method can benefit people with children who has to load and unload a baby carriage each time the destination is reached. Thus, there is a need of a navigation system that has a function to find a one-stop location, and if no one-stop location is found, to find the most efficient route with the shortest overall distance, or a route that can accomplish the order of arrival desired by the user.

SUMMARY OF THE INVENTION

It is, therefore, an object of the present invention to provide a navigation method and system that can find a location that has two or more destinations so that the user can visit such destinations by one stop of the vehicle.

It is another object of the present invention to provide a navigation method and system that can find a one-stop location that has two or more destinations if such a location exists, and if not, find an optimum route that can visit the plurality of destinations with the minimum number of stops and the shortest overall distance.

It is a further object of the present invention to provide a navigation method and system that has unique display screens to assist the user to specify the order of arriving the destinations and the range of searching two or more destinations.

The navigation system of the present invention operates to find a location for visiting a plurality of destinations, such as points of interest, by stopping a car only once or a minimum number of times. In a case where there is no one-stop location for selected multiple destinations, the navigation system detects and displays an optimum route in consideration of multiple destinations to be visited.

One aspect of the present invention is a navigation method for finding an optimum location and route for multiple locations and guiding the user to the destinations with use of a navigation system. The navigation method of the present invention is comprised of the steps of: specifying a plurality of destinations in a navigation system; searching a one-stop location where two or more specified destinations exist or searching a location of each destination; displaying results of search for prompting a user to decide whether recommended locations of the destinations in the search result is acceptable; repeating the above steps of searching locations and displaying the search results until the user accepts recommended locations of the destinations; and guiding the user to the destinations accepted by the user.

In the step of searching the one-stop location, the navigation method searches a location where all of the specified destinations exist so that the user can visit all of the destinations without driving a vehicle to other location. Alternatively, the navigation method searches two or more one-stop locations where each one-stop location has two or more specified destinations so that the user can visit the specified destinations within the one-stop location without driving a vehicle to other location. When no one-stop location is found, the navigation method selects a route of shortest overall length for guiding the user to the plurality of destinations.

In the step of specifying the plurality of destinations, the navigation method allows the user to assign an order of arriving the specified destinations before finding locations of the destinations and optimum routes to the destinations. When a one-stop location is found, the navigation method ignores the assigned order of arrival for the two or more destinations that exist within the one-stop location.

In the step of specifying the plurality of destinations, the navigation method allows the user to select types of points of interest with use of a point of interest database stored in a map data storage of the navigation system. Further, in the step of specifying the plurality of destinations, the navigation system allows the user to input a place name or an address of a destination and to select types of destinations for the remaining destinations with use of a point of interest database stored in a map data storage of the navigation system.

Another aspect of the present invention is a navigation system for implementing the various steps defined in the navigation method of the present invention noted above. The navigation system searches a location for visiting a plurality of destinations, such as points of interest, by stopping a car only once or a minimum number of times. In a case where there is no one-stop location is found for selected multiple destinations, the navigation system detects and displays an optimum route to the multiple destinations in the arrival order defined by the user.

According to the present invention, the navigation system is able to find a location and a route to destinations for efficiently visiting a plurality of destinations with the minimum number of stops or the shortest overall distance. When there are two or more destinations, the navigation method and system will find a one-stop location that has all the destinations so that the user can visit such destinations by one stop of the vehicle. If such a one-stop location is not found, the navigation method and system will find a second best location and route that can visit the plurality of destinations with the minimum number of stops and the shortest overall distance. The navigation system has unique display screens to assist the user to specify the order of arriving the destinations and the distance range for searching two or more destinations that can accomplish one-stop arrival.

Accordingly, the user is relieved from the trouble of finding a parking spot for a vehicle at each destination. Especially, when the user is a handicapped person or an old person, or the user is traveling with a handicapped person or an old person, such a one-stop location can minimize the trouble of riding on and off the vehicle or loading and unloading a wheelchair, etc. Moreover, the one-stop location can benefit a user with a small child who does not have to load and unload a baby carriage each time the destination is reached.

BRIEF DESCRIPTION OF THE DRAWINGS

FIGS. 6A-6C are schematic diagrams showing examples of screen of the navigation system of the present invention in which the user selects multiple destinations. FIGS. 6A-6B show screens for selecting an input method in which "Point of Interest" is selected in FIG. 6A and "Today's Plan" is selected in FIG. 6B.

FIGS. 7A-7C are schematic diagrams showing examples of screen of the navigation system of the present invention for selecting a plurality of destinations.

FIGS. 8A-8C are schematic diagrams showing examples of screen display of navigation system of the present invention in which the user specifies the order of arrival for the multiple destinations.

FIGS. 9A-9C are schematic diagrams showing examples of screen display of the navigation system of the present invention which illustrate the results of search for multiple destinations.

FIGS. 10A-10C are schematic diagrams showing examples of screen display of the navigation system of the present invention.

FIGS. 11A-11B are schematic diagrams showing examples of screen display of the navigation system of the present invention.

DETAILED DESCRIPTION OF THE INVENTION

The present invention will be described in detail with reference to the accompanying drawings. The navigation system of the present invention is designed to find a location for visiting a plurality of destinations (ex. points of interest) by stopping a car only once or a least number of times (hereafter may also referred as a "one-stop location"). In a case where there is no one-stop location for selected multiple destinations, the navigation system detects and displays an optimum route in consideration of multiple destinations to be visited.

An example of one-stop location is a shopping mall where desired destinations are located within the mall and the user can visit all the desired destinations by short walk. Another example of one-stop location is a high-rise building or a compound of high-rise buildings where company offices, restaurants, hospitals, hotels, bookstores, etc., are located so that a user can visit two or more destinations within the building or compound. Namely, once the user arrives the one-stop location, he can visit all the desired destinations without driving a vehicle to other location.

It should be noted that although the present invention is described mainly for the case of finding destinations through the "Points of Interest" input method such as described with reference to FIGS. 1C-1F, the present invention can be applied to other input method as well. Typically, when a user selects a "Points of Interest" input method, the navigation system of the present invention moves to a screen for specifying multiple destinations for finding a one-stop location. Another example to find a one-stop location is a "Today's Plan" input method where a user can input multiple of destinations to visit for the day, although various other input method is also possible.

Figure 3:
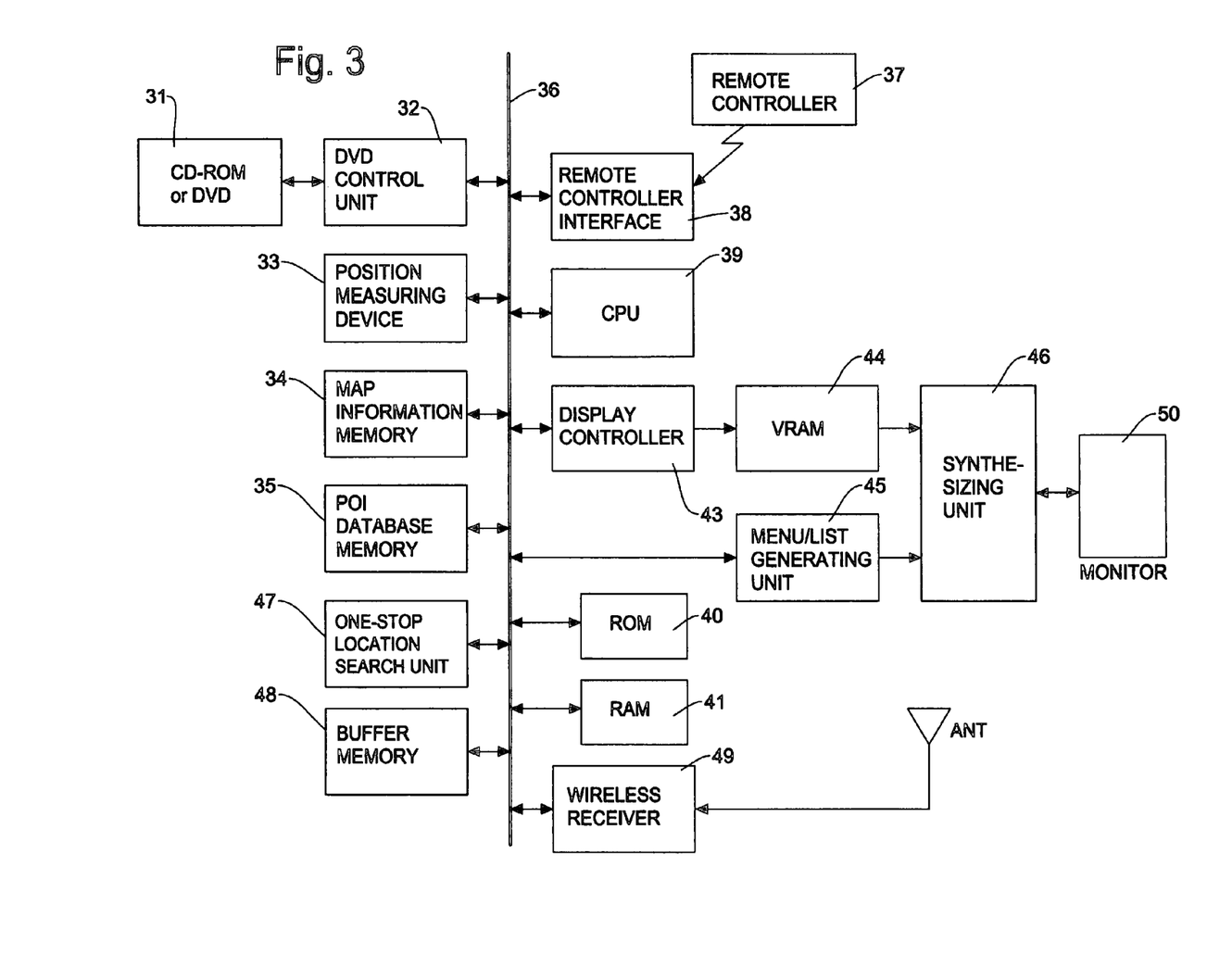
FIG. 3 is a schematic diagram showing an example of map image where points of interest are illustrated thereon and the user wants to visit three different types of destinations in accordance with the present invention.

The navigation method and apparatus of the present invention is advantageously applicable to a vehicle navigation system. FIG. 3 shows an example of structure of a vehicle navigation system implementing the present invention. It should be noted that the present invention can also be applied to a portable navigation device such as a one implemented by a PDA (personal digital assistant) device, a lap-top computer, or other hand-held devices.

In the block diagram of FIG. 3, the navigation system includes a map storage medium 31 such as a CD-ROM, DVD, hard disc or other storage means (hereafter "DVD") for storing map information, a DVD control unit 32 for a controlling an operation for reading the map information from the DVD, a position measuring device 33 for measuring the present vehicle position. The position measuring device 33 has a vehicle speed sensor for detecting a moving distance, a gyroscope for detecting a moving direction, a microprocessor for calculating a position, a GPS receiver, and etc.

The block diagram of FIG. 3 further includes a map information (data) memory 34 for storing the map information which is read out from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

The navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating a map image (a map guide image and an arrow guide image) on the basis of the map information, a VRAM (Video RAM) 44 for storing images generated by the display controller, a menu/list generating unit 45 for generating menu image/various list images, a synthesizing unit 46, a one-stop location search controller 47, a buffer memory 48, a wireless receiver 49, and a monitor (display) 50.

The one-stop location search controller 47 directly relates to the present invention. The one-stop location search controller 47 controls an overall operation for searching an effective route to two or more destinations to meet the user's particular needs. For example, the one-stop location search controller 47 controls to find a location having two or more destinations so that the user has to stop the car only one time or a minimum number of times to visit the destinations. As an other example, the one-stop location search controller 47 controls to find a route to visit multiple destinations in an order of arrival prioritized by the user.

The method of the present invention gives preference to a one-stop location if it exists for the selected destinations, and if no such a place exists, attempts to find an optimum route by accounting for all destinations and purposes of the visits. For example, the route may be configured based on degrees of arrival priority (order of visiting the destinations) given by the user, or the shortest overall distance to visit all of the destinations, or other factors such as traffic conditions. The traffic incident information can be retrieved from a service provider through the wireless receiver 49.

Figure 4:
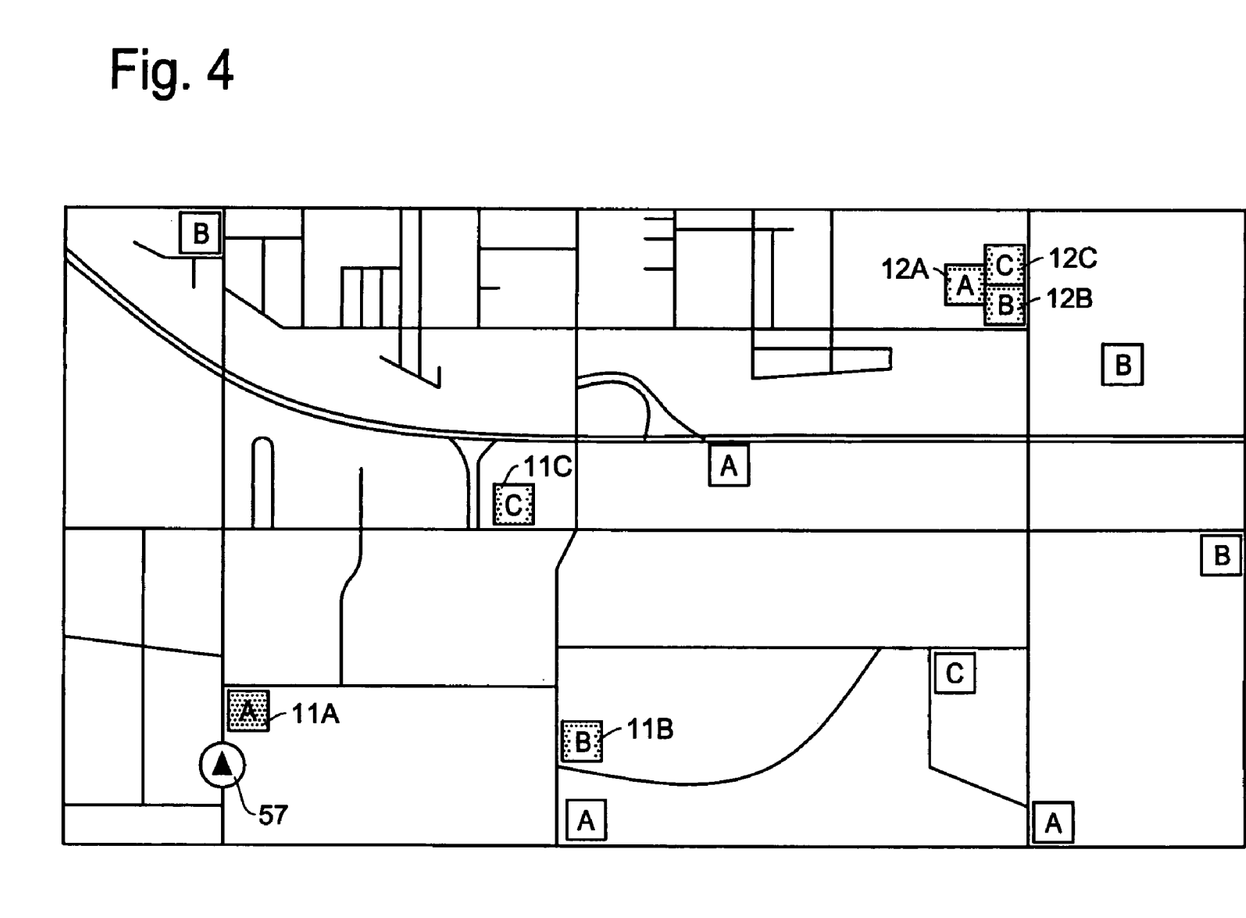
FIG. 4 is a block diagram showing an example of structure in the vehicle navigation system for implementing the present invention.

FIG. 4 shows a situation where points of interest are illustrated on a map image and the user wants to reach three destinations whose particular addresses are irrelevant as long as the user can accomplish the objective of the trip. A reference number 57 indicates the current vehicle position. In FIG. 4, similar to the example shown in FIG. 2, it is assumed that a user wants to take out some cash, eat pizza for a lunch, and shop at a supermarket, and a location mark "A" indicates an ATM, a location mark "B" indicates a pizza shop, and a location mark "C" indicates a supermarket. By following the route that proceeds to the locations 11A, 11B and 11C, the user can accomplish the objective in the shortest distance.

However, there is an area where all three POIs (12A, 12B and 12C) are clustered such that the user is able to accomplish the objectives by one-stop. Despite the distance, the user often prefers to visit the one-stop location because the time and trouble of finding a parking spot for a vehicle at each destination can be eliminated. Especially when the user is a handicapped person or an old person, or the user is traveling with a handicapped person or an old person, such a one-stop location can minimize the trouble of riding on and off the vehicle or loading an unloading a wheelchair. Moreover, the one-stop location can benefit a user with a small child who needs to load and unload a baby carriage each time the destination is reached.

Thus, in the present invention, even if the distance to such a one-stop location is significantly longer than that separately going to destinations, the navigation system prioritizes the route to the one-stop location over the route for separately visiting the destinations. However, it is sometimes difficult or impossible to find such a one-stop location within a reasonable distance range. Thus, the navigation system provides means for finding a second best route in which the user is allowed to select a degree of priority in the order of visiting the selected POIs. In the case where there is no one-stop location or no priority of visiting order, the navigation system finds a route that has the shortest drive length for visiting the specified multiple destinations.

Figure 5:
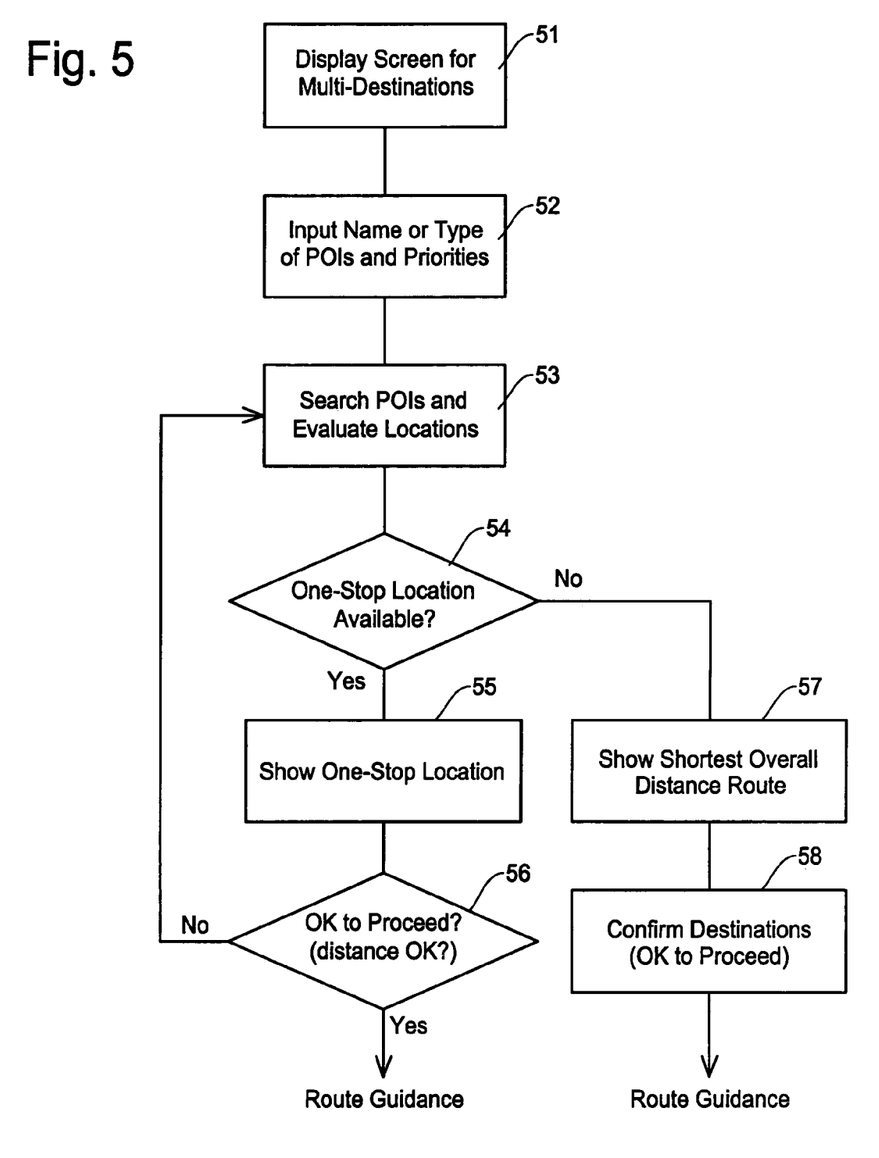
FIG. 5 is a flow chart showing the steps of selecting a location and route for visiting a plurality of points of interest in the present invention.

The flow chart of FIG. 5 shows a basic operational process for searching and displaying suitable locations and routes for multiple destinations in the present invention. In step 51, in response to the selection of the input method, such as "Point of Interest" or "Today's Plan", the navigation system of the present invention displays a screen to allow the user to input multiple destinations. Other than such traditional input methods, the navigation system can also provide an input method for the purpose of implementing the present invention.

Then, at step 52, the user inputs two or more destinations to be visited, typically, by selecting types (categories) of destinations from a POI database. At this time, if the user has any specific order of visiting the destinations in mind, for example, she wants to buy an ice cream to eat it at home, she may specify that the supermarket is to be visited last. As will be explained later, the POIs to be visited can be selected by its specific place name or address or by its general category or sub-category.

After the user has input all information necessary to find the locations and routes, in step 53, the navigation system searches the POIs in the map data and evaluates the locations of the POIs. As noted above, it is often desirable to visit a one-stop location rather than visiting POIs that are separately located even though the distance to the one-stop location is substantially longer than other route. Thus, the navigation system examines whether there is any location that has all of types of POIs specified by the user or as many types of POIs specified by the user as possible, i.e., a one-stop location.

After searching and evaluating the POI data, the navigation system then determines whether there is a one-stop location available in step 54. If a one-stop location is found, the navigation system of the present invention places the highest priority on that location. Thus, in step 55, the navigation system shows the one-stop location which can visit two or more POIs by one-stop of the vehicle. If two or more one-stop locations exist, the navigation system will choose a one-stop location closest to the current user position.

Typically, in the case where the number of POIs specified by the user is not large, such as three, it may be relatively easy to find such a one-stop location. However, depending on the number of POIs and the type of POIs, such a one-stop location may be difficult to find or too far away even if it can be found. Thus, even when the one-stop location is found, the user may not like the location because it is too far away.

Thus, the navigation system asks the user whether the proposed one-stop location is acceptable in step 56. If the user does not like the one-stop location, she rejects this proposal, and the process goes back to the step 53 to further search the POIs to find a one-stop location which is, for example, closer to the user. If the one-stop location is satisfiable, the navigation system determines an optimum route to the one-stop location and starts route guidance to guide the user to the one-stop location.

In the case where no one-stop location is found in the step 54, the navigation system will show an optimum route, typically the shortest route, in consideration of all POIs to be visited at step 57. Further, the route may be configured based on degrees of arrival priority given by the user or other factors such as traffic conditions. If the proposed route is acceptable, the user confirms the destinations at step 58, thus, the navigation system starts route guidance to guide the user to the destinations in the order specified by the user.

If there are many POIs to be visited, it becomes more unrealistic to find a location that has all the desired POIs. It should be noted that not all POIs need to be clustered in one location. For example, when there are five points of interest to be visited, the navigation system may return a search result with a one-stop location where two POIs are located and another one-stop location where three POIs are located. In this case, the total number of stops can be two as opposed to five stops that would be necessary if each POI were located apart.

Figure 6A:
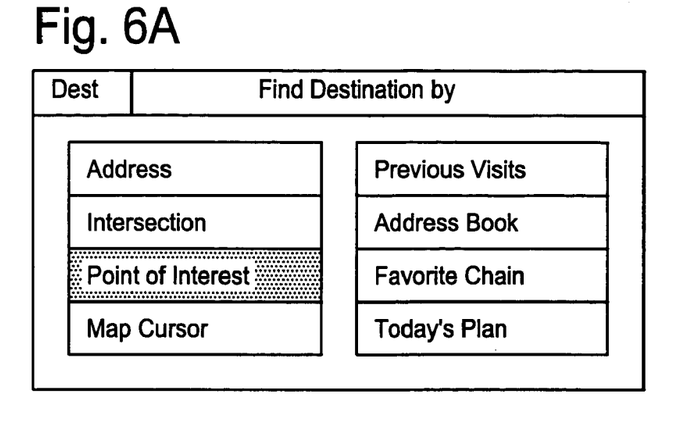
Figure 6B:
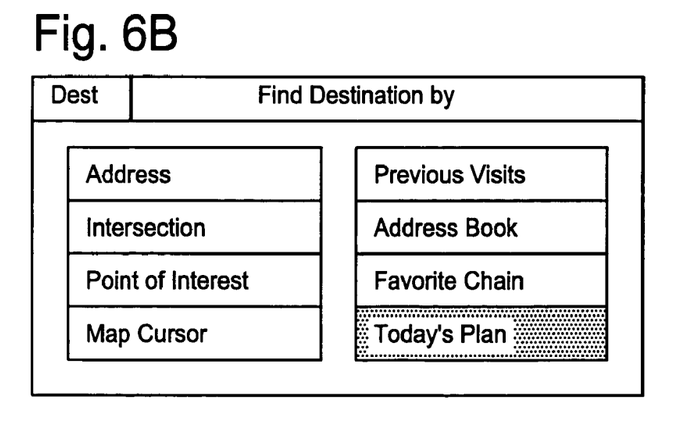
Figure 6C:
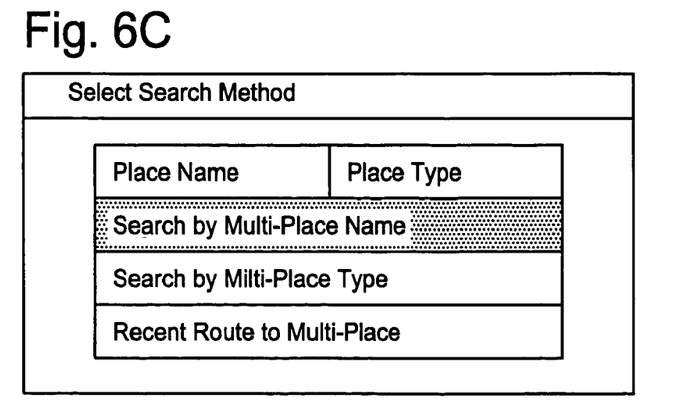
FIG. 6C shows a screen for selecting a method of searching a location and route for the multiple destinations in the present invention.

FIGS. 6A-6C are schematic diagrams showing examples of screen of the navigation system of the present invention in which the user selects multiple destinations. Although these examples are directed to the situation in which a menu list of FIG. 6C for selecting multiple destinations is activated through the traditional input method of FIG. 6A or 6B, various other paths can be possible. FIG. 6A shows a screen for selecting an input method of "Point of Interest" to activate a screen of FIG. 6C. FIG. 6B shows a screen for selecting an input method of "Today's Plan" to activate the screen of FIG. 6C.

FIG. 6C shows a screen for selecting a method of searching a location and route for visiting multiple destinations in the present invention. This example includes menu keys for selecting search method for multiple destinations of the present invention. The menu keys unique to the navigation method of the present invention are "Search by Multi-Place Name", "Search by Multi-Place Type" and "Recent Route to Multi-Place" as shown in FIG. 6C.

The menu key "Search by Multi-Place Name" is used for selecting one or more destinations by specifying the names or addresses. It should be noted that if a particular address is specified in this mode, the navigation system cannot find a one-stop location unless this particular address designates a large shopping mall, multi-purpose building, etc. An example of cases where a particular address of destination or a place name of destination is specified is explained with reference to FIGS. 10C and 11B.

A menu key "Search by Multi-Place Type" is used for selecting two or more destinations by specifying their categories or sub-categories. Typically, such categories are selected from a category list of categories of points of interest (POIs) produced from the map data in the navigation system. A menu key "Recent Route to Multi-Place" is used for selecting two or more destinations by recalling the record of past visits to such multiple destinations.

Figure 7A:
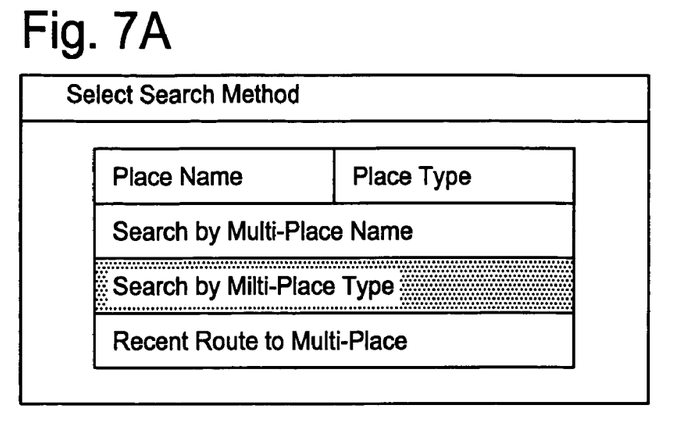
FIG. 7A shows a display in which the search method "Search by Multi-Place Type" is activated.
Figure 7B:
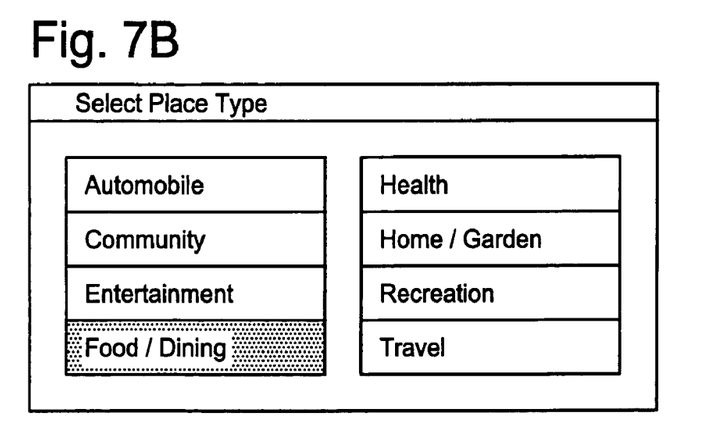
FIG. 7B shows a display which lists general categories of POIs.
Figure 7C:
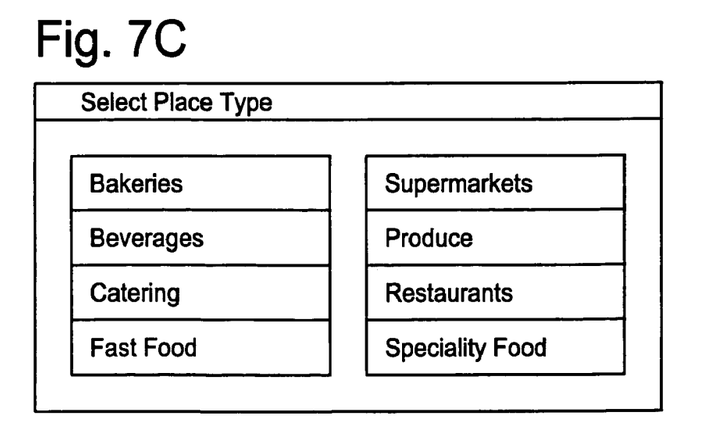
FIG. 7C shows a display which lists sub-categories of POIs.

FIGS. 7A-7C are display examples showing the steps of selecting a plurality of destinations to visit by using POI data. FIG. 7A shows a display which is the same as that shown in FIG. 6C except that the search method "Search by Multi-Place Type" is activated to specify categories of the destinations. Then, as shown in FIG. 7B, the navigation system displays a category list which lists general categories of POIs retrieved from the map data storage (DVD) 31 (FIG. 3). For example, when the user wants to search a supermarket, he selects a general category of "Food/Dining" in the list. Then, as shown in FIG. 7C, the navigation system displays a list of sub-categories of "food/dining" retrieved from the map data storage 31. The user selects the sub-category "Supermarkets" in the list. The user can select several other types of POI in a similar manner described above. Thus, in this example, it is assumed that "ATM", "Pizza", and "Supermarket" are selected as categories of multiple (three) destinations.

Figure 8A:
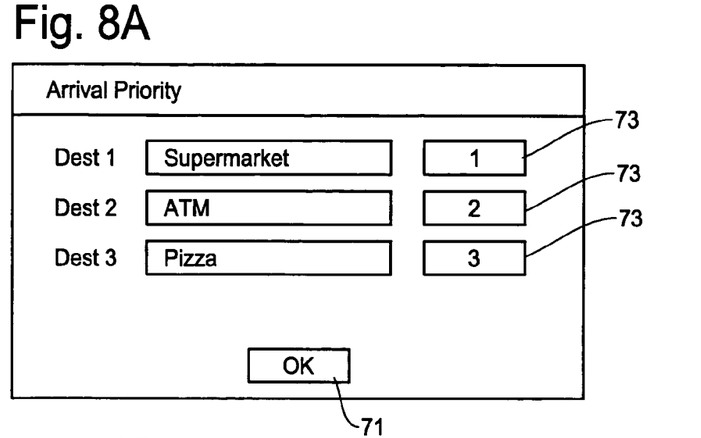
FIGS. 8A and 8B show a case where the order of arrival is specified by the numbers.
Figure 8B:
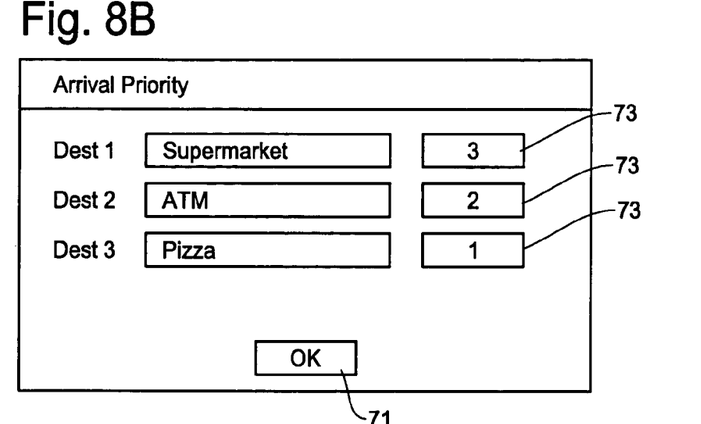
Figure 8C:
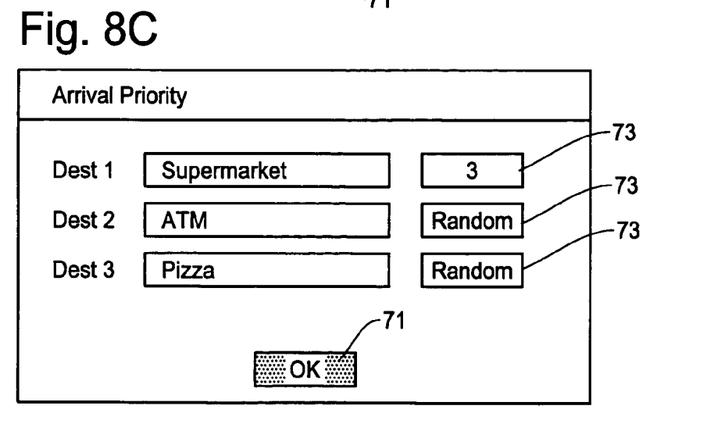
FIG. 8C shows a case where the order of arrival is specified for certain destinations while the arrival order is arbitrary for other destinations.

After the user has set the POI categories to be visited, the navigation system allows the user to input the order by which the user wants to visit the destinations. FIGS. 8A-8C show examples of screen of the navigation system for specifying an order of arriving the selected types of POIs. These screens will be displayed after the user has specified all the types of points of interest to be visited in the previous steps. In these examples, the user inputs the order in order indicator boxes 73 that are located next to the selected types of POIs. A search distance range may be preset in the navigation system, or the user selects a search distance from the current vehicle position as shown in FIGS. 10B-10C and 11A-11B.

In the display example in FIG. 8A, a "supermarket" will be visited first, then to an "ATM" and finally to a "pizza" shop. An OK button 71 is used when the user has completed the procedure of setting the order of visit so that the navigation system will search the appropriate POIs and calculate the route. As noted above, the navigation system tries to find a one-stop location where the user can visit all of the selected types of POIs in that location by one stop of the vehicle.

The navigation system finds two or more one-stop locations in the case where a one-stop location for all of the destinations is not found. For example, when there are five destinations, the navigation system may produce a search result in which two destinations are in a one-stop location and remaining three destinations are in another one-stop location. When a one-stop location is found, or two or more one-stop locations are found, the navigation system typically ignores the arrival order of the destinations within each one-stop location. If such a one-stop location is not available after searching the map data, the navigation system further searches to find POIs at separate locations and a route satisfying the order specified by the user with the shortest drive length, shortest drive time in view of the traffic conditions, etc.

The user can easily change the order of visiting the selected types of POIs. Suppose that the user wants to visit "Supermarket" last so that groceries bought at the market remains fresh until the user gets back to home. FIG. 8B shows a display example that is similar to that shown in FIG. 8A except that the numbers in the order indicator boxes 73 have been changed for "Supermarket" and "Pizza" entries. In this display, a "Supermarket" will be visited last while a "Pizza" shop will be visited first. The user changes the order by, for example, pressing the order indicator boxes 73 and selecting appropriate numbers.

In some cases, the user is not concerned about the order of visit for some destinations. For example, the user may select three points of interest which can be visited in any order. In still other cases, the user is not concerned about the order of visit for some POIs while concerned about the order of visit for some other POIs. FIG. 8C shows an example where the user wants to visit a "supermarket" last but is not concerned about the order of visiting an "ATM" and a "pizza" shop. Similar to the display example of FIG. 8B, the user wants to visit the "supermarket" last as indicated by the number in the order indicator box 73 although the arrival order of the other destinations can be arbitrary.

Thus, the order indicator boxes 73 for entries "ATM" and "Pizza" are changed to "Random" which indicates that an order of arrival for those destinations is not an issue. In this situation, an "ATM" may be visited before visiting a "pizza" shop or after visiting the "pizza" shop. When the user has determined the order of visit, the navigation system will search a one-stop location where all of the selected types of POIs exist or separate POIs with the shortest route that satisfies the arrival order specified by the user.

In a case where there are many POIs to be visited, it becomes more difficult to find a one-stop location that has all the desired POIs in the location. It should be noted that, as noted above, not all POIs need to be confined in one location. For example, when there are five points of interest to be visited, the navigation system may return a search result where two POIs are in a one-stop location and remaining three POIs are on another one-stop location. In this case, the total number of stops can be two as opposed to five stops that would be necessary if each POI are located separately.

Figure 9A:
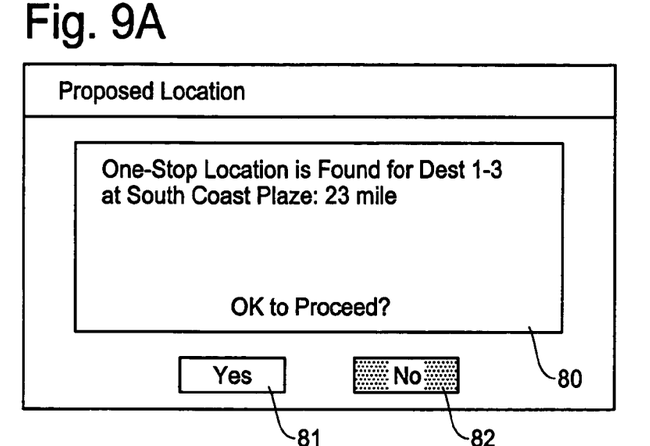
FIG. 9A shows a case where a one-stop location is found for all the destinations.
Figure 9B:
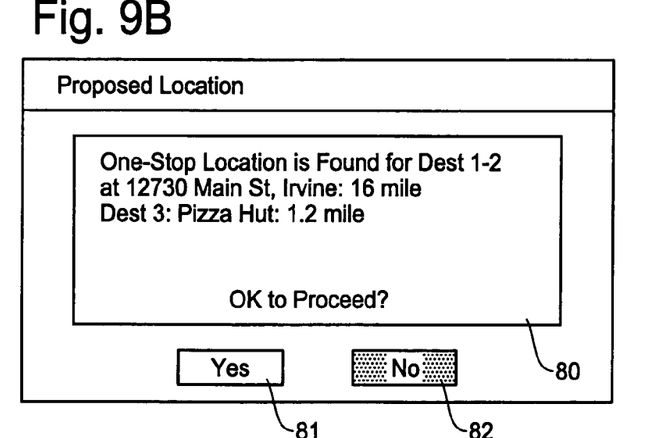
FIG. 9B shows a case where a one-stop location is found for two destinations but not all destinations.
Figure 9C:
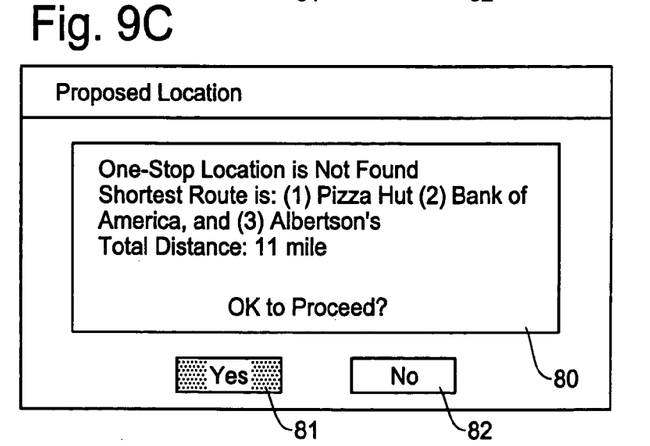
FIG. 9C shows a case where no one-stop location is found.

Examples of screen display of the navigation system of the present invention showing the results of search for multiple destinations are shown in FIGS. 9A-9C. The search results in FIGS. 9A-9C are based on the types of POIs and the arrival order specified in FIG. 8C. FIG. 9A shows a case where a one-stop location is found for all the destinations, i.e., for the types of POIs selected in FIGS. 8A-8C. The display of this example indicates the results of search in a message box 80 that a one-stop location is found for the destinations 1-3 and its distance is 23 miles from the current vehicle position. Such a one stop-location may be indicated by a location name such as a name of the shopping mall, if applicable, or an address of the location.

Further in this example, the navigation system further asks in the message box 80 whether it is OK to proceed. If the user presses a "Yes" key 81 in FIG. 9A, the navigation system calculates a route to the one-stop location and starts the route guidance operation. If the user does not like the location, because of the distance for example, she presses a "No" key 82, so that the navigation system further searches POIs to satisfy the user's need. For example, such an alternatively search will be performed for the distance range which is smaller than the previous search.

FIG. 9B shows a case where a one-stop location is found for two destinations but not all destinations. Namely, the navigation system has found the one-stop location where the destinations 1 and 2 exist, but the destination 3 is not in that location. The one-stop location in this example is indicated in the message box 80 by the address of the location. If the user presses the "Yes" key 81 in FIG. 9B, the navigation system calculates a route to the one-stop location and a next route from the one-stop location to the destination 3, and starts the route guidance operation. If the user does not like the location, she presses the "No" key 82, so that the navigation system further searches POIs that satisfy the user's need.

FIG. 9C shows a case where no one-stop location is found for the selected types of POIs. The navigation system shows recommended places that satisfy the types of POIs and the arrival order specified in FIG. 8C. The message box 80 indicates the shortest route with specific place names and an order of visiting the places. The message box 80 shows, "Pizza Hut" for the pizza shop, "Bank of America" for the ATM, and "Albertson's" for the supermarket. In this example, the message box 80 also shows the total distance of the route for visiting the POIs in this order.

In the example described above, the user selected a category of POI for each POI to be visited. Namely, the user did not select, for example, a particular name of the supermarket. In some cases, however, the user wants to input a specific POI name or an address within the selected category. For instance, the user may want to visit a supermarket "Albertson's" rather than other supermarkets because she has a membership card of "Albertson's".

Figure 10A:
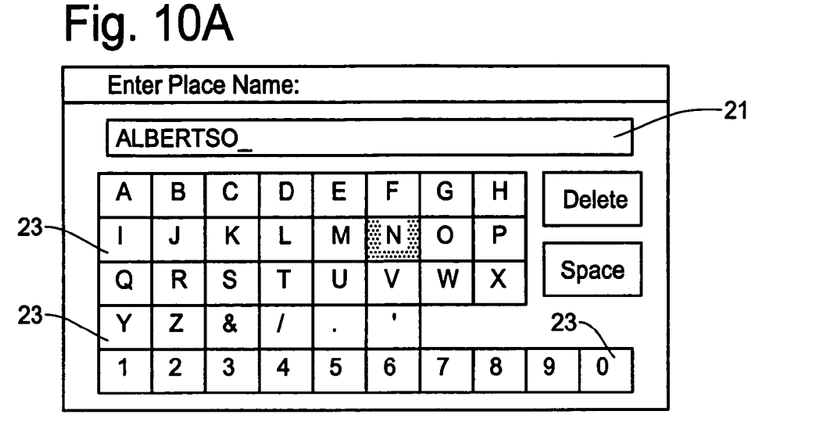
FIG. 10A shows a keyboard for inputting a place name or address.
Figure 10B:
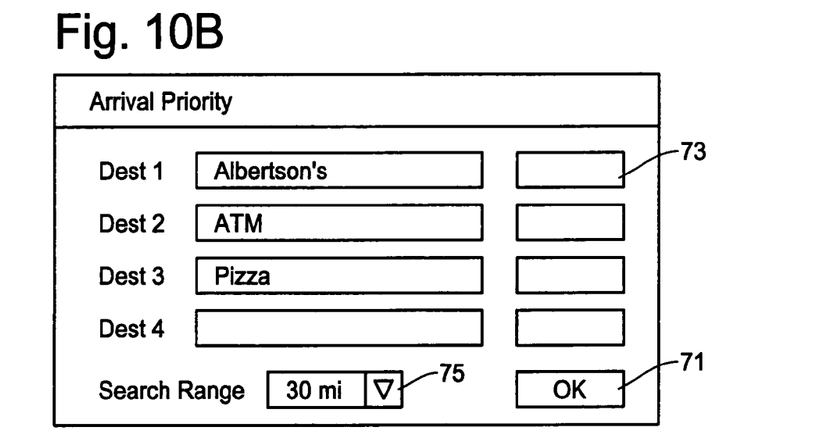
FIG. 10B shows a situation where a plurality of destinations are being selected by the user.
Figure 10C:
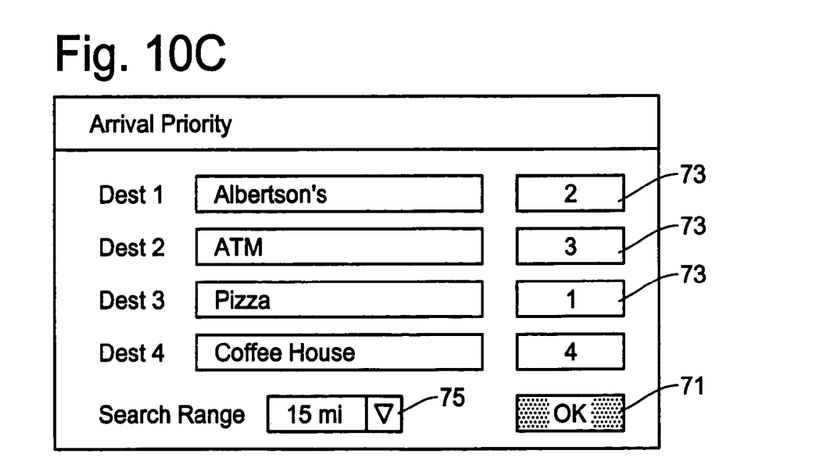
FIG. 10C shows a screen where the user assigns the arrival priority of the destinations and selects the search range.

FIGS. 10A-10C are example of display screen of the navigation system of the present invention in which the user inputs a specific name of the type of POI. This situation arises when many chain stores or branch offices of same name exist. In this example, the user inputs the name "Albertson's" through a keyboard screen of FIG. 10A rather than selecting a general category of supermarket. FIG. 10B shows a screen on which the user is selecting other types of destination. In this example, the navigation system provides a search range menu 75 so that the user can select a search range, typically, a radius distance from the current vehicle position. Alternatively, the search range can be preset in the navigation system so that the user does not have to select the search distance every time.

After selecting types of POIs and a specific POI name, or an address, the user selects the order of visiting the destinations in the order indicator boxes 73 as shown in FIG. 10C. In this example, the destination 1 is defined by a specific name of supermarket "Albertson's" and destinations 2-3 are defined by generic categories of POI. The user also selects the search range, for example, a radius distance from the current user position. Although the destination 1 is defined by the specific name, there are many places by that name, thus, many routes can be possible to satisfy the user's request.

Figure 11A:
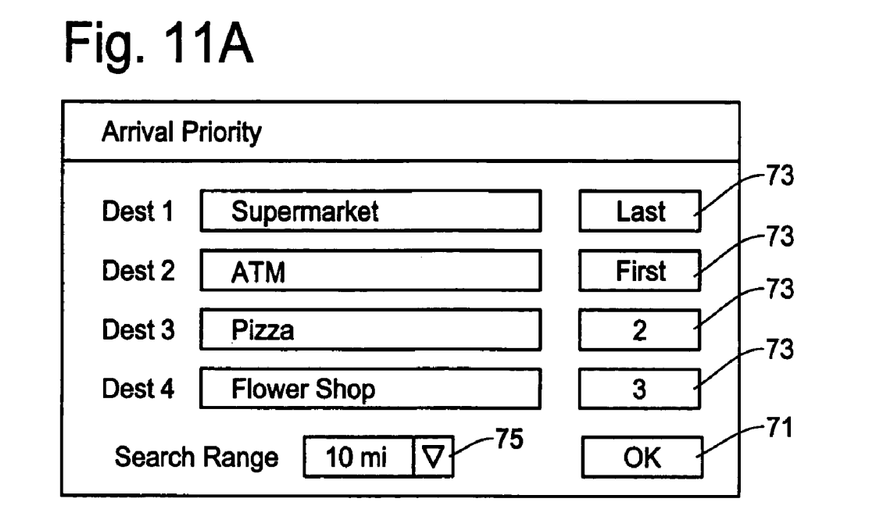
FIG. 11A shows a case where the first and last destinations and the order of all the other destinations are specified on the screen.
Figure 11B:
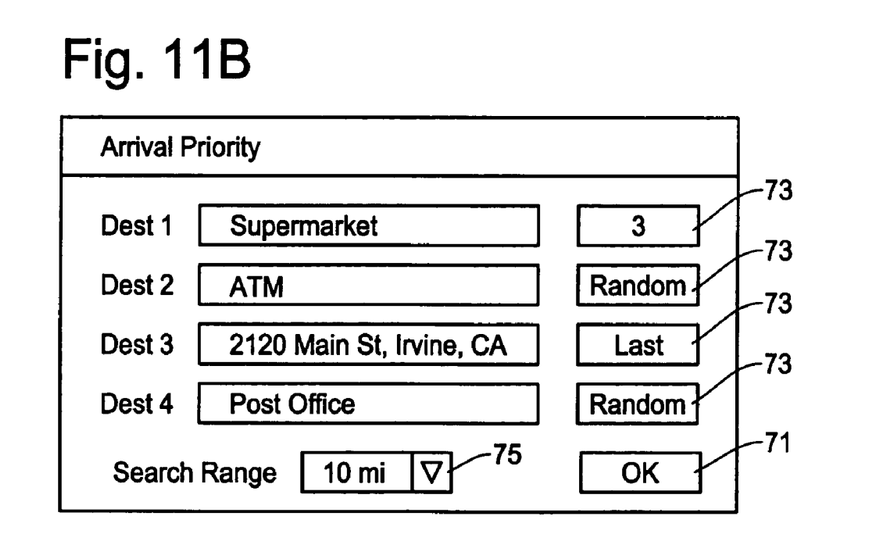
FIG. 11B shows a case where the last destination and immediately before the last destination are specified on the screen.

FIGS. 11A-11B are schematic diagrams showing examples of screen display of the navigation system of the present invention for specifying an order of visiting the destinations and a search distance. FIG. 11A shows a case where the arrival order is specified by the words "First" and "Last" rather than the numbers. When the user presses the "OK" key 71, the navigation system will search a one-stop location where all of the selected types of POIs exist or separate POIs with the shortest route that satisfies the arrival order specified by the user.

In many cases, the user is concerned about the first or last place to visit but not an order of other destinations. For example, the user often has a definite final destination while other destinations can be visited arbitrary. It can become difficult to track the number of places to visit when there are many places to visit. Difficulty can arise when many places to visit exist and the user is not certain what the last number of the order is. Thus, in the example of FIG. 11A, it is feasible to label the first place to visit as "First" in the order indicator 73 and the last place to visit as "Last" so that the user can easily tell which place is to be visited first or last. The display shown in FIG. 11A can incorporate the function to make the order of other POIs irrelevant as described with reference to FIG. 8C by using the word "Random".

FIG. 11B shows a case where the last place and immediately before the last place are specified on the screen. FIG. 11B also shows a case that the user inputs a specific address as one of the destinations with use of the keyboard screen of FIG. 10A. For example, in a case where the user wants to visit a friend's home, she inputs the address of the friend's house (destination 3). Suppose the friend's house is the last destination, and the user wants to buy an ice cream and bring the ice cream to her friend's house. Thus, the user wants to arrive the supermarket to buy the ice cream immediately before the last destination, i.e., friend's house.

Therefore, in the example of FIG. 11B, the friend's house indicated by the address of destination 3 is the last (4th) to visit and the supermarket is the third, i.e., immediately before the last, to visit. In this manner, POIs en route to the friend's house need not be defined by specific names or addresses whereas the final destination (friend's house) must be a specific address.

The time required for finding an optimum location and a route can be significant when there are numerous points of interest to be visited. It is feasible to send the data that specifies POIs required to calculate the route to a remote navigation server through a wireless communication system that can calculate and return the result to the navigation system. The navigation system receives the result of search from the server through the wireless receiver 49 in FIGS. 4 and 6. This configuration is especially effective when the processing speed of the navigation system is not sufficient to efficiently produce an optimum route.

As has been described above, according to the present invention, the navigation system is able to find a location and a route to destinations for efficiently visiting a plurality of destinations with the minimum number of stops or the shortest overall distance. When there are two or more destinations, the navigation method and system will find a one-stop location that has all the destinations so that the user can visit such destinations by one stop of the vehicle. If such a one-stop location is not found, the navigation method and system will find a second best location and route that can visit the plurality of destinations with the minimum number of stops and the shortest overall distance. The navigation system has unique display screens to assist the user to specify the order of arriving the destinations and the distance range for searching two or more destinations that can accomplish one-stop arrival.

Accordingly, the user is relieved from the trouble of finding a parking spot for a vehicle at each destination. Especially, when the user is a handicapped person or an old person, or the user is traveling with a handicapped person or an old person, such a one-stop location can minimize the trouble of riding on and off the vehicle or loading and unloading a wheelchair, etc. Moreover, the one-stop location can benefit a user with a small child who does not have to load and unload a baby carriage each time the destination is reached.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method for guiding a user to a plurality of destinations, comprising the following steps of:
   specifying a plurality of destinations in a navigation system;
   searching a one-stop location where two or more specified destinations exist or searching a location of each destination when said one-stop location is not found;
   displaying results of search for prompting a user to decide whether recommended locations of the destinations in the search results are acceptable;
   repeating the above steps of searching locations and displaying the search results until the user accepts recommended locations of the destinations; and
   guiding the user to the locations of the destinations accepted by the user.

2. A navigation method as defined in claim 1, wherein said step of searching the one-stop location includes a step of searching a location where all of the specified destinations exist so that the user can visit all of the destinations without driving a vehicle to other location.

3. A navigation method as defined in claim 1, wherein said step of searching the one-stop location includes a step of searching two or more one-stop locations where each one-stop location has two or more specified destinations so that the user can visit the specified destinations within the one-stop location without driving a vehicle to other location.

4. A navigation method as defined in claim 1, wherein said step of specifying the plurality of destinations includes a step of assigning an order of arriving the specified destinations before finding locations of the destinations and optimum routes to the destinations, and said step of searching the one-stop location includes a step of ignoring the assigned order of arrival for the two or more destinations that exist within the one-stop location.

5. A navigation method as defined in claim 1, wherein said step of specifying the plurality of destinations includes a step of selecting types of points of interest with use of a point of interest database stored in a map data storage of the navigation system.

6. A navigation method as defined in claim 1, wherein said step of specifying the plurality of destinations includes a step of inputting a place name or an address of a destination, and a step of selecting types of destinations for the remaining destinations with use of a point of interest database stored in a map data storage of the navigation system.

7. A navigation method as defined in claim 1, wherein said step of specifying the plurality of destinations includes a step of assigning an order of arriving the specified destinations before finding locations of the destinations and optimum routes to the destinations, and said step of assigning the order of arriving the specified destinations includes a step of selecting numeric indicators for defining the order of arrival.

8. A navigation method as defined in claim 1, wherein said step of specifying the plurality of destinations includes a step of assigning an order of arriving the specified destinations before finding locations of the destinations and optimum routes to the destinations, and said step of assigning the order of arriving the specified destinations includes a step of selecting non-numeric indicators for defining the order of arrival.

9. A navigation method as defined in claim 1, wherein said step of guiding the user to the locations of the destinations includes a step of selecting a route of shortest overall length for guiding the user to the plurality of destinations when no one-stop location is found.

10. A navigation method as defined in claim 1, wherein said steps of searching the location and displaying the search results includes a step of communicating with a remote navigation server so that the remote navigation server searches the locations of the destinations and the navigation system receives the results of search through a wireless receiver to display the results.

11. A navigation system for guiding a user to a plurality of destinations, comprising:
   means for specifying a plurality of destinations in a navigation system;
   means for searching a one-stop location where two or more specified destinations exist or searching a location of each destination when said one-stop location is not found;
   means for displaying results of search for prompting a user to decide whether recommended locations of the destinations in the search results are acceptable;
   means for repeating the above processes of searching locations and displaying the search results until the user accepts recommended locations of the destinations; and
   means for guiding the user to the locations of the destinations accepted by the user.

12. A navigation system as defined in claim 11, wherein said means for searching the one-stop location includes means for searching a location where all of the specified destinations exist so that the user can visit all of the destinations without driving a vehicle to other location.

13. A navigation system as defined in claim 11, wherein said means for searching the one-stop location includes means for searching two or more one-stop locations where each one-stop location has two or more specified destinations so that the user can visit the specified destinations within the one-stop location without driving a vehicle to other location.

14. A navigation system as defined in claim 11, wherein said means for specifying the plurality of destinations includes means for assigning an order of arriving the specified destinations before finding locations of the destinations and optimum routes to the destinations, and said means for searching the one-stop location includes means for ignoring the assigned order of arrival for the two or more destinations that exist within the one-stop location.

15. A navigation system as defined in claim 11, wherein said means for specifying the plurality of destinations includes means for selecting types of points of interest with use of a point of interest database stored in a map data storage of the navigation system.

16. A navigation system as defined in claim 11, wherein said means for specifying the plurality of destinations includes means for inputting a place name or an address of a destination, and means for selecting types of destinations for the remaining destinations with use of a point of interest database stored in a map data storage of the navigation system.

17. A navigation system as defined in claim 11, wherein said means for specifying the plurality of destinations includes means for assigning an order of arriving the specified destinations before finding locations of the destinations and optimum routes to the destinations, and said means for assigning the order of arriving the specified destinations includes means for selecting numeric indicators for defining the order of arrival.

18. A navigation system as defined in claim 11, wherein said means for specifying the plurality of destinations includes means for assigning an order of arriving the specified destinations before finding locations of the destinations and optimum routes to the destinations, and said means for assigning the order of arriving the specified destinations includes means for selecting non-numeric indicators for defining the order of arrival.

19. A navigation system as defined in claim 11, wherein said means for guiding the user to the locations of the destinations includes means for selecting a route of shortest overall length for guiding the user to the plurality of destinations when no one-stop location is found.

20. A navigation system as defined in claim 11, wherein said means for searching the location and displaying the search results includes means for communicating with a remote navigation server so that the remote navigation server searches the locations of the destinations and the navigation system receives the results of search through a wireless receiver to display the results.

* * * * *